United States Patent
Seong

(10) Patent No.: US 10,622,846 B2
(45) Date of Patent: Apr. 14, 2020

(54) METHOD AND APPARATUS FOR POSITION ALIGNMENT USING LOW-FREQUENCY ANTENNAS IN WIRELESS POWER TRANSFER SYSTEM

(71) Applicants: Hyundai Motor Company, Seoul (KR); Kia Motors Corporation, Seoul (KR)

(72) Inventor: Jae Yong Seong, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 156 days.

(21) Appl. No.: 15/892,805

(22) Filed: Feb. 9, 2018

(65) Prior Publication Data

US 2018/0241258 A1 Aug. 23, 2018

Related U.S. Application Data

(60) Provisional application No. 62/559,145, filed on Sep. 15, 2017, provisional application No. 62/460,150, filed on Feb. 17, 2017.

(30) Foreign Application Priority Data

Jan. 30, 2018 (KR) .................. 10-2018-0011609

(51) Int. Cl.
*H02J 50/90* (2016.01)
*G01B 7/14* (2006.01)
(Continued)

(52) U.S. Cl.
CPC .............. *H02J 50/90* (2016.02); *B60L 53/12* (2019.02); *B60L 53/38* (2019.02); *G01B 7/14* (2013.01);
(Continued)

(58) Field of Classification Search
CPC .. B60L 3/00; B60L 53/12; B60L 53/20; B60L 53/22; B60L 53/30; B60L 53/31;
(Continued)

(56) References Cited

U.S. PATENT DOCUMENTS

2012/0095617 A1* 4/2012 Martin ................. B62D 15/028
701/1
2012/0098483 A1* 4/2012 Patel .................. B62D 15/0285
320/108

(Continued)

*Primary Examiner* — Huy Q Phan
*Assistant Examiner* — David B Frederiksen
(74) *Attorney, Agent, or Firm* — Mintz Levin Cohn Ferris Glovsky and Popeo, P.C.; Peter F. Corless

(57) ABSTRACT

A position alignment method for position alignment between a position alignment apparatus including a reception pad and a magnetic field detection apparatus including a transmission pad which performs wireless power transfer (WPT) includes: connecting, by the position alignment apparatus, to the magnetic field detection apparatus using wireless communication, wherein at least one antenna is located in the transmission pad; radiating, by the position alignment apparatus, at least one magnetic field using at least one antenna located in the reception pad; receiving, by the position alignment apparatus, magnetic field measurement values from the magnetic field detection apparatus; and obtaining, by the position alignment apparatus, information indicating a positional difference between the reception pad and the transmission pad by comparing the magnetic field measurement values with previously-stored reference values.

10 Claims, 11 Drawing Sheets

(51) Int. Cl.
*H02J 50/12* (2016.01)
*B60L 53/38* (2019.01)
*B60L 53/12* (2019.01)
*H02J 7/02* (2016.01)

(52) U.S. Cl.
CPC .............. *H02J 50/12* (2016.02); *H02J 7/025* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01); *Y02T 90/16* (2013.01)

(58) Field of Classification Search
CPC .......... B60L 53/35; B60L 53/36; B60L 53/38; B60L 53/65; B60L 53/124; B60L 53/126; H04B 5/00; H02J 50/10; H02J 50/40; H02J 50/60
See application file for complete search history.

(56) References Cited

U.S. PATENT DOCUMENTS

| | | | |
|---|---|---|---|
| 2014/0015329 A1* | 1/2014 | Widmer | G01D 5/2006 307/104 |
| 2014/0145514 A1* | 5/2014 | Konno | B60L 3/00 307/104 |
| 2015/0175025 A1* | 6/2015 | Barbul | B60L 53/305 320/108 |
| 2015/0180286 A1* | 6/2015 | Asanuma | G01B 7/003 307/104 |
| 2017/0117757 A1* | 4/2017 | Park | H02J 50/80 |
| 2017/0212210 A1* | 7/2017 | Chen | G01S 5/06 |
| 2017/0361724 A1* | 12/2017 | Seong | H02J 50/90 |

* cited by examiner

| | LOOP ANTENNA SHAPE | RADIATION RESISTANCE |
|---|---|---|
| EMPTY CORE LOOP ANTENNA |  | $R_r = \eta \frac{8}{3} \pi^3 \left(\frac{A}{\lambda^2}\right)^2$ |
| FERRITE CORE LOOP ANTENNA |  | $R_r = \eta_0 \frac{8}{3} \pi^3 \left(N \mu_{reff} \frac{A}{\lambda^2}\right)^2$ |

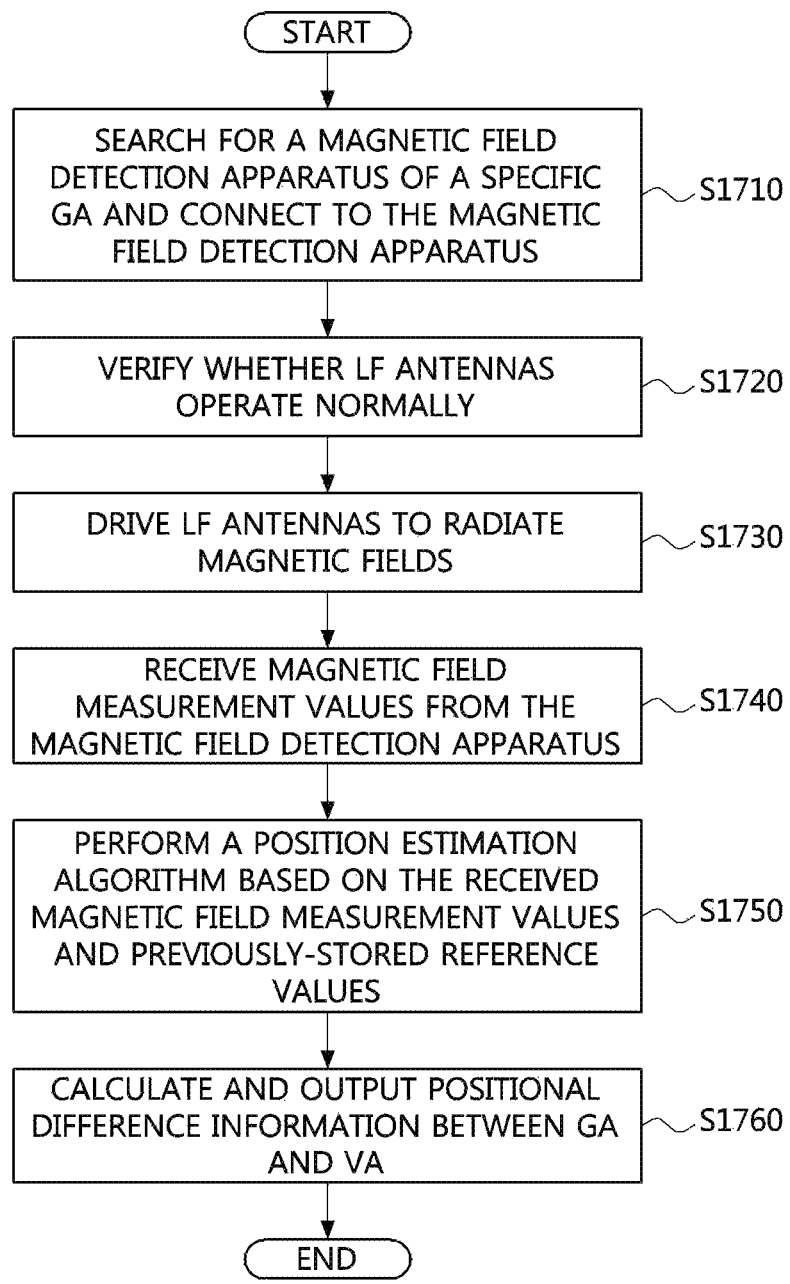

METHOD AND APPARATUS FOR POSITION ALIGNMENT USING LOW-FREQUENCY ANTENNAS IN WIRELESS POWER TRANSFER SYSTEM

CROSS-REFERENCE TO RELATED APPLICATIONS

The present application claims the benefit of priority to U.S. Provisional Patent Application No. 62/460,150, filed on Feb. 17, 2017 in the United States Patent and Trademark Office, U.S. Provisional Patent Application No. 62/559,145, filed on Sep. 15, 2017 in the United States Patent and Trademark Office, and Korean Patent Application No. 10-2018-0011609, filed on Jan. 30, 2018, the entire contents of which are incorporated herein by reference.

TECHNICAL FIELD

The present disclosure relates generally to a method and an apparatus for position alignment of a wireless power transfer (WPT) system and, more particularly, to a method and an apparatus for position alignment of a WPT system using strengths of magnetic field signals detected in low-frequency antennas.

BACKGROUND

As is generally known in the art, electric vehicles (EV) are driven by battery power, resulting in reduced pollution sources such as exhaust gas and noise as compared to conventional gasoline engine vehicles. EVs are typically classified into hybrid electric vehicles (HEVs), plug-in hybrid electric vehicles (PHEVs), and electric vehicles (EVs), depending on their driving sources. The HEV is equipped with an engine as a main power source and an electric motor as an auxiliary power source. The PHEV is equipped with an electric motor as a main power source and utilizes an engine when a battery is discharged. The EV is equipped with an electric motor as a main power source, and does not have an engine.

Wireless charging of a battery which drives the electric motor of the EV can be performed by coupling a primary coil of a charging station and a secondary coil of the EV to achieve magnetic resonance. In a magnetic resonance WPT system, if the primary and secondary coils are not properly aligned, the efficiency of the WPT may be greatly reduced. Therefore, proper alignment of the primary and secondary coils may be required.

According to a conventional alignment method, the secondary coil, which is installed in the EV, may be aligned with the primary coil using a rear camera. The primary coil may be installed in a ground assembly (GA) in a parking space. According to another conventional alignment method, once the EV is parked in a parking space, a moveable charging pad is moved so that the primary coil and the secondary coil of the EV become aligned.

However, these conventional techniques may require user interventions, thus generating user inconveniences and possible errors in the alignment of the coils, which may cause excessive system performance degradation. Therefore, in a magnetic resonance WPT system which is sensitive to the misalignment of the coils, it is difficult to achieve the optimal WPT efficiency, and the stability and reliability of the system can be reduced as a result. Accordingly, there is a need for a method of precisely aligning the primary coil of the GA in a charging station and the secondary coil of the EV to charge a high-voltage battery mounted on the EV in a WPT system.

SUMMARY

Embodiments of the present disclosure provide a position alignment method using strengths of magnetic field signals detected in low-frequency antennas. Embodiments of the present disclosure also provide a position alignment apparatus using strengths of magnetic field signals detected in low-frequency antennas.

According to embodiments of the present disclosure, a position alignment method for position alignment between a position alignment apparatus including a reception pad and a magnetic field detection apparatus including a transmission pad which performs wireless power transfer (WPT) comprises: connecting, by the position alignment apparatus, to the magnetic field detection apparatus using wireless communication, wherein at least one antenna is located in the transmission pad; radiating, by the position alignment apparatus, at least one magnetic field using at least one antenna located in the reception pad; receiving, by the position alignment apparatus, magnetic field measurement values from the magnetic field detection apparatus; and obtaining, by the position alignment apparatus, information indicating a positional difference between the reception pad and the transmission pad by comparing the magnetic field measurement values with previously-stored reference values.

The connecting to the magnetic field detection apparatus may further include: searching, by the position alignment apparatus, for a magnetic field detection apparatus within a predefined radius using wireless communication; discovering, by the position alignment apparatus, at least one magnetic field detection apparatus within the predefined radius; selecting, by the position alignment apparatus, one of the discovered at least one magnetic field detection apparatus based on at least one of: a received signal strength indicator (RSSI), a time of flight (ToF), a time difference of flight (TDoF), a time of arrival (ToA), and a time difference of arrival (TDoA); and connecting, by the position alignment apparatus, to the selected magnetic field detection apparatus.

The radiating of the at least one magnetic field may further include: determining, by the position alignment apparatus, whether the at least one antenna located in the reception pad operates normally; and driving, by the position alignment apparatus, the at least one antenna located in the reception pad to radiate the at least one magnetic field when the at least one antenna located in the reception pad operates normally.

The at least one antenna located in the reception pad and the at least one antenna located in the transmission pad may be ferrite rod antennas using a low-frequency (LF) band.

The information indicating the positional difference between the reception pad and the transmission pad may include at least one of: a separation distance along an x-axis representing a horizontal direction with respect to the reception pad, a separation distance along a y-axis representing a vertical direction with respect to the reception pad, a separation distance along a z-axis representing a direction perpendicular to the reception pad, and a torsional degree between the horizontal direction of the reception pad and a horizontal direction of the transmission pad.

The at least one antenna located in the reception pad may include two antennas located in a first region and a second region, respectively, into which the reception pad is divided in a left-right direction.

The at least one antenna located in the transmission pad may include four antennas located in an upper left region, an upper right region, a lower left region, and a lower right region, respectively, into which the transmission pad is divided.

The magnetic field measurement values may include measurement values which each of the four antennas located in the transmission pad obtains by detecting magnetic fields radiated by the two antennas located in the reception pad.

Furthermore, according to embodiments of the present disclosure, a position alignment apparatus for performing position alignment between the position alignment apparatus including a reception pad and a magnetic field detection apparatus including a transmission pad which performs wireless power transfer (WPT) includes: at least one antenna located in the reception pad; at least one processor; and a memory storing program instructions executed by the at least one processor. When the program instructions are executed, the processor is configured to: connect to the magnetic field detection apparatus using wireless communication, wherein at least one antenna is located in the transmission pad; radiate at least one magnetic field using at least one antenna located in the reception pad; receive magnetic field measurement values from the magnetic field detection apparatus; and obtain information indicating a positional difference between the reception pad and the transmission pad by comparing the magnetic field measurement values with previously-stored reference values.

The at least one processor may be further configured to: search for a magnetic field detection apparatus within a predefined radius using wireless communication; discover at least one magnetic field detection apparatus within the predefined radius; select one of the discovered at least one magnetic field detection apparatus based on at least one of: a received signal strength indicator (RSSI), a time of flight (ToF), a time difference of flight (TDoF), a time of arrival (ToA), and a time difference of arrival (TDoA); and connect to the selected magnetic field detection apparatus.

The at least one processor may be further configured to: determine whether the at least one antenna located in the reception pad operates normally; and drive the at least one antenna located in the reception pad to radiate the at least one magnetic field when the at least one antenna located in the reception pad operates normally.

The at least one antenna located in the reception pad and the at least one antenna located in the transmission pad may be ferrite rod antennas using a low-frequency (LF) band.

The information indicating the positional difference between the reception pad and the transmission pad may include at least one of: a separation distance along an x-axis representing a horizontal direction with respect to the reception pad, a separation distance along a y-axis representing a vertical direction with respect to the reception pad, a separation distance along a z-axis representing a direction perpendicular to the reception pad, and a torsional degree between the horizontal direction of the reception pad and a horizontal direction of the transmission pad.

The at least one antenna located in the reception pad may include two antennas located in a first region and a second region, respectively, into which the reception pad is divided in a left-right direction.

The at least one antenna located in the transmission pad may include four antennas located in an upper left region, an upper right region, a lower left region, and a lower right region, respectively, into which the transmission pad is divided.

The magnetic field measurement values may include measurement values which each of the four antennas located in the transmission pad obtains by detecting magnetic fields radiated by the two antennas located in the reception pad.

According to the embodiments of the present disclosure, the primary coil of the GA and the secondary coil of the EV can be precisely aligned, and thus the WPT efficiency can be maximized and optimized. Also, the torsional degree of the primary coil of the GA and the secondary coil of the EV can be outputted and provided to the user without manual intervention of the user.

BRIEF DESCRIPTION OF DRAWINGS

The embodiments herein may be better understood by referring to the following description in conjunction with the accompanying drawings, briefly described below, in which like reference numerals indicate identically or functionally similar elements.

FIG. 17 is a flowchart for explaining a position alignment method according to embodiments of the present disclosure.

Figure 1:
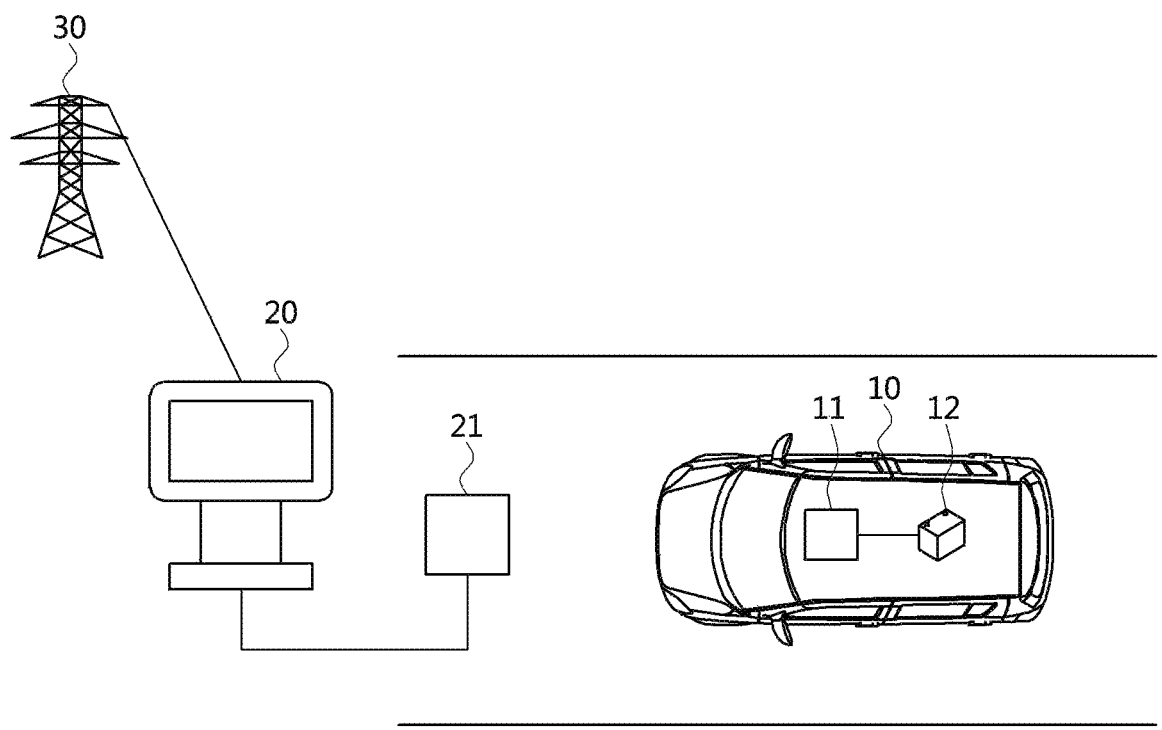
FIG. 1 is a conceptual diagram illustrating a concept of a wireless power transfer (WPT) to which embodiments of the present disclosure are applied.

It may be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particularly intended application and use environment. In the figures, reference numbers refer to the same or equivalent parts of the present disclosure throughout the several figures of the drawing.

DETAILED DESCRIPTION OF THE EMBODIMENTS

Reference will now be made in detail to various embodiments of the present disclosure, examples of which are illustrated in the accompanying drawings and described below. While the disclosure will be described in conjunction with certain embodiments, it will be understood that the present description is not intended to limit the disclosure to those embodiments. On the contrary, the disclosure is intended to cover not only the disclosed embodiments, but also various alternatives, modifications, equivalents and other embodiments, which may be included within the spirit and scope of the disclosure as defined by the appended claims.

It will be understood that although the terms "first," "second," etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components.

Terms are used herein only to describe the embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings.

Terms used in the present disclosure are defined as follows.

"Electric Vehicle (EV)": An automobile, as defined in 49 CFR 523.3, intended for highway use, powered by an electric motor that draws current from an on-vehicle energy storage device including a battery, which is rechargeable from an off-vehicle source including residential or public electric service or an on-vehicle fuel powered generator. The EV may be four or more wheeled vehicle manufactured for use primarily on public streets, roads.

The EV may be referred to as an electric car, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle (PEV)": An Electric Vehicle that recharges the on-vehicle primary battery by connecting to the power grid.

"Plug-in vehicle (PV)": An electric vehicle rechargeable through wireless charging from an electric vehicle supply equipment (EVSE) without using a physical plug or a physical socket.

"Heavy duty vehicle; H.D. Vehicle": Any four- or more wheeled vehicle as defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads and highways and rated at less than 4,545 kg gross vehicle weight.

"Wireless power charging system (WCS)": A system for a wireless power transfer and control between the GA and VA including alignment and communications. This system transfers energy from the electric supply network to the electric vehicle electromagnetically through a two-part loosely coupled transformer.

"Wireless power transfer (WPT)": A transfer of electrical power from an AC supply network to an electric vehicle by contactless means.

"Utility": A set of systems which supply electrical energy and include a customer information system (CIS), an advanced metering infrastructure (AMI), rates and revenue system, etc. The utility may provide an EV with energy through rates table and discrete events. Also, the utility may provide information related to certification on EVs, interval of power consumption measurements, and tariff.

"Smart charging": A system in which EVSE and/or PEV communicate with power grid to optimize charging ratio or discharging ratio of EV by reflecting capacity of the power grid or expense of use.

"Automatic charging": A procedure in which inductive charging is automatically performed after a vehicle is located in a proper position corresponding to a primary charger assembly that can transfer power. The automatic charging may be performed after obtaining necessary authentication and right.

"Interoperability": A state in which component of a system interwork with corresponding components of the system to perform operations aimed by the system. Also, information interoperability may mean capability that two or more networks, systems, devices, applications, or components can efficiently share and easily use information without giving inconvenience to users.

"Inductive charging system": A system transferring energy from a power source to an EV through a two-part gapped core transformer in which the two halves of the transformer, primary and secondary coils are physically separated from one another. In the present disclosure, the inductive charging system may correspond to an EV power transfer system.

"Inductive coupler": A transformer formed by the coil in the GA Coil and the coil in the VA Coil that allows power to be transferred with galvanic isolation.

"Inductive coupling": Magnetic coupling between two coils. In the present disclosure, coupling between the GA Coil and the VA Coil.

"Ground assembly (GA)": An assembly on the infrastructure side including the GA Coil, a power/frequency conversion device and GA controller as well as the wiring from the grid and between each device, filtering circuits, housing(s) etc., necessary to function as the power source of wireless power charging system. The GA may include the communication elements necessary for communication between the GA and the VA.

"Vehicle assembly (VA)": An assembly on the vehicle including the VA Coil, rectifier/power conversion device and VA controller as well as the wiring to the vehicle batteries and between each device, filtering circuits, housing(s), etc., necessary to function as the vehicle part of a wireless power charging system. The VA may include the communication elements necessary for communication between the VA and the GA.

The GA may be referred to as a primary device (PD), and the VA may be referred to as a secondary device (SD).

"Primary device": An apparatus which provides the contactless coupling to the secondary device. That is, the primary device may be an apparatus external to an EV. When the EV is receiving power, the primary device may act as the source of the power to be transferred. The primary device may include the housing and all covers.

"Secondary device": An apparatus mounted on the EV which provides the contactless coupling to the primary device. That is, the secondary device may be disposed in the EV. When the EV is receiving power, the secondary device may transfer the power from the primary to the EV. The secondary device may include the housing and all covers.

"GA controller": A portion of the GA that regulates the output power level to the GA Coil based on information from the vehicle.

"VA controller": A portion of the VA that monitors specific on-vehicle parameters during charging and initiates communication with the GA to control output power level.

The GA controller may be referred to as a primary device communication controller (PDCC), and the VA controller may be referred to as an electric vehicle communication controller (EVCC).

"Magnetic gap": A vertical distance between the plane of the higher of the top portion of the litz wire or the top portion of the magnetic material in the GA Coil to the plane of the lower of the bottom portion of the litz wire or the magnetic material in the VA Coil when aligned.

"Ambient temperature": A ground-level temperature of the air measured at the subsystem under consideration and not in direct sun light.

"Vehicle ground clearance": A vertical distance between the ground surface and the lowest part of the vehicle floor pan.

"Vehicle magnetic ground clearance": A vertical distance between the plane of the lower of the bottom portion of the litz wire or the magnetic material in the VA Coil mounted on a vehicle to the ground surface.

"VA Coil magnetic surface distance": A distance between the plane of the nearest magnetic or conducting component surface to the lower external surface of the VA coil when mounted. This distance includes any protective coverings and additional items that may be packaged in the VA Coil enclosure.

The VA coil may be referred to as a secondary coil, a vehicle coil, or a receive coil. Similarly, the GA coil may be referred to as a primary coil, or a transmit coil.

"Exposed conductive component": A conductive component of electrical equipment (e.g., an electric vehicle) that may be touched and which is not normally energized but which may become energized in a case of a fault.

"Hazardous live component": A live component, which under certain conditions can give a harmful electric shock.

"Live component": Any conductor or conductive component intended to be electrically energized in normal use.

"Direct contact": Contact of persons with live components. (See IEC 61440)

"Indirect contact": Contact of persons with exposed, conductive, and energized components made live by an insulation failure. (See IEC 61140)

"Alignment": A process of finding the relative position of primary device to secondary device and/or finding the relative position of secondary device to primary device for the efficient power transfer that is specified. In the present disclosure, the alignment may direct to a fine positioning of the wireless power transfer system.

"Pairing": A process by which a vehicle is correlated with the unique dedicated primary device, at which it is located and from which the power will be transferred. The pairing may include the process by which a VA controller and GA controller of a charging spot are correlated. The correlation/association process may include the process of the establishment of a relationship between two peer communication entities.

"Command and control communication": A communication between the EV supply equipment and the EV exchanges information necessary to start, control and terminate the process of WPT.

"High level communication (HLC)": HLC is a special kind of digital communication. HLC is necessary for additional services which are not covered by command & control communication. The data link of the HLC may use a power line communication (PLC), but it is not limited.

"Low power excitation (LPE)": LPE means a technique of activating the primary device for the fine positioning ad pairing so that the EV can detect the primary device, and vice versa.

"Service set identifier (SSID)": SSID is a unique identifier including 32-characters attached to a header of a packet transmitted on a wireless LAN. The SSID identifies the basic service set (BSS) to which the wireless device attempts to connect. The SSID basically distinguishes multiple wireless LANs. Therefore, all access points (Aps) and all terminal/station devices that want to use a specific wireless LAN can use the same SSID. Devices that do not use a unique SSID are not able to join the BSS. Since the SSID is shown as plain text, it may not provide any security features to the network.

"Extended service set identifier (ESSID)": ESSID is a name of the network to which you want to connect. It is similar to SSID but can be a more extended concept.

"Basic service set identifier (BSSID)": BSSID including 48bits is used to distinguish a specific BSS. In the case of an infrastructure BSS network, the BSSID may be medium access control (MAC) of the AP equipment. For an independent BSS or ad hoc network, the BSSID can be generated with any value.

The charging station may comprise at least one GA and at least one GA controller managing the at least one GA. The GA may comprise at least one wireless communication device. The charging station may mean a place having at least one GA, which is disposed in home, office, public place, road, parking area, etc.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus including the controller in conjunction with one or more other components, as would be appreciated by a person of ordinary skill in the art.

Hereinafter, embodiments according to embodiments of the present disclosure will be explained in detail by referring to accompanying figures.

FIG. 1 is a conceptual diagram illustrating a concept of a wireless power transfer (WPT) to which embodiments of the present disclosure is applied.

As shown in FIG. 1, a wireless power transfer (WPT) procedure may be performed by at least one component of an electric vehicle (EV) 10 and a charging station 20, and may be used for wirelessly transferring power to the EV 10.

The EV 10 may be defined as a vehicle supplying an electric power stored in a rechargeable energy storage including a battery 12 as an energy source of an electric motor which is a power train system of the EV 10. However, the EV 10 according to embodiments of the present disclosure may include a hybrid electric vehicle (HEV) having an electric motor and an internal combustion engine together, and may include not only an automobile but also a motorcycle, a cart, a scooter, and an electric bicycle. Also, the EV 10 may include a power reception pad 11 including a reception coil for charging the battery 12 wirelessly and may include a plug connection for conductively charging the battery 12. The EV 10 configured for conductively charging the battery may be referred to as a plug-in electric vehicle (PEV).

The charging station 20 may be connected to a power grid 30 or a power backbone, and may provide an alternating current (AC) power or a direct current (DC) power to a power transmission pad 21 including a transmission coil through a power link. Also, the charging station 20 may communicate with an infrastructure management system or an infrastructure server that manages the power grid 30 or a power network through wired/wireless communications, and performs wireless communications with the EV 10. The wireless communications may be Bluetooth, Zigbee, cellular, wireless local area network (WLAN), or the like. For example, the charging station 20 may be located at various places including a parking area attached to the owner's house of the EV 10, a parking area for charging an EV at a gas station, a parking area at a shopping center or a workplace.

A process of wirelessly charging the battery 12 of the EV 10 may begin with first placing the power reception pad 11 of the EV 10 in an energy field generated by the power transmission pad 21 of the charging station 20, and making the reception coil and the transmission coil be interacted or coupled with each other. An electromotive force may be induced in the power reception pad 11 as a result of the interaction or coupling, and the battery 12 may be charged by the induced electromotive force.

The charging station 20 and the transmission pad 21 may be referred to as a ground assembly (GA) in whole or in part, where the GA may refer to the defined meaning provided hereinabove. All or part of the internal components and the reception pad 11 of the EV 10 may be referred to as a vehicle assembly (VA), in which the VA may refer to the previously defined meaning.

The power transmission pad 21 or the power reception pad 11 may be configured to be non-polarized or polarized. In a case that a pad is non-polarized, there is one pole in a center of the pad and an opposite pole in an external periphery. A flux may be formed to exit from the center of the pad and return at all to external boundaries of the pad. In a case that a pad is polarized, it may have a respective pole at either end portion of the pad. A magnetic flux may be formed based on an orientation of the pad.

Figure 2:
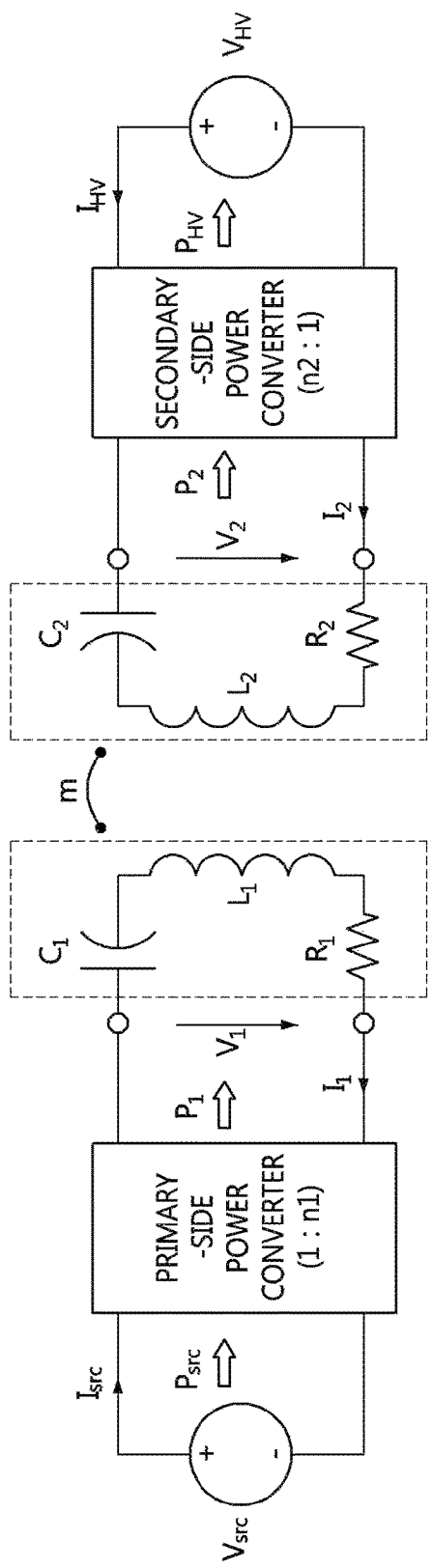
FIG. 2 is a conceptual diagram illustrating a wireless power transfer circuit according to embodiments of the present disclosure.

FIG. 2 is a conceptual diagram illustrating a wireless power transfer circuit according to embodiments of the present disclosure.

As shown in FIG. 2, a schematic configuration of a circuit in which a wireless power transfer is performed in an EV WPT system may be seen.

The left side of FIG. 2 may be interpreted as expressing all or part of a power source $V_{src}$ supplied from the power network, the charging station 20, and the transmission pad 21 in FIG. 1, and the right side of FIG. 2 may be interpreted as expressing all or part of the EV including the reception pad and the battery.

First, the left side circuit of FIG. 2 may provide an output power $P_{src}$ corresponding to the power source $V_{src}$ supplied from the power network to a wireless charging power converter. The wireless charging power converter may supply an output power $P_1$ converted from the output power $P_{src}$ through frequency-converting and AC-to-DC converting to generate an electromagnetic field at a desired operating frequency in a transmission coil $L_1$.

Specifically, the wireless charging power converter may include an AC/DC converter for converting the power $P_{src}$ which is an AC power supplied from the power network into a DC power, and a low-frequency (LF) converter for converting the DC power into a DC power having an operating frequency suitable for wireless charging. For example, the operating frequency for wireless charging may be determined to be within 80 to 90 kHz.

The power $P_1$ output from the wireless charging power converter may be supplied again to a circuit including the transmission coil $L_1$, a first capacitor $C_1$ and a first resistor $R_1$. A capacitance of the first capacitor $C_1$ may be determined as a value to have an operating frequency suitable for charging together with the transmission coil $L_1$. The first resistor $R_1$ may represent a power loss occurred by the transmission coil $L_1$ and the first capacitor $C_1$.

Further, the transmission coil $L_1$ may be made to have electromagnetic coupling, which is defined by a coupling coefficient m, with the reception coil $L_2$ so that a power $P_2$ is transmitted, or the power $P_2$ is induced in the reception coil $L_2$. Therefore, the meaning of power transfer in the present disclosure may be used together with the meaning of power induction.

Still further, the power $P_2$ induced in or transferred to the reception coil $L_2$ may be provided to an EV power converter. A capacitance of a second capacitor $C_2$ may be determined as a value to have an operating frequency suitable for wireless charging together with the reception coil $L_2$, and a second resistor $R_2$ may represent a power loss occurred by the reception coil $L_2$ and the second capacitor $C_2$.

The EV power converter may include an LF/DC converter that converts the supplied power $P_2$ of a specific operating frequency to a DC power having a voltage level suitable for the battery $V_{HV}$ of the EV.

The electric power $P_{HV}$ converted from the power $P_2$ supplied to the EV power converter may be output, and the power $P_{HV}$ may be used for charging the battery $V_{HV}$ disposed in the EV.

The right side circuit of FIG. 2 may further include a switch for selectively connecting or disconnecting the reception coil $L_2$ with the battery $V_{HV}$. Resonance frequencies of the transmission coil $L_1$ and the reception coil $L_2$ may be similar or identical to each other, and the reception coil $L_2$ may be positioned near the electromagnetic field generated by the transmission coil $L_1$.

Here, the circuit of FIG. 2 should be understood as an illustrative circuit for wireless power transfer in the EV WPT system used for embodiments of the present disclosure, and is not limited to the circuit illustrated in FIG. 2. On the other hand, since the power loss may increase as the transmission coil $L_1$ and the reception coil $L_2$ are located at a long distance, it may be an important factor to properly set the relative positions of the transmission coil $L_1$ and the reception coil $L_2$.

The transmission coil $L_1$ may be included in the transmission pad 14 in FIG. 1, and the reception coil $L_2$ may be included in the reception pad 11 in FIG. 1. Therefore, positioning between the transmission pad and the reception pad or positioning between the EV and the transmission pad will be described below with reference to the drawings.

Figure 3:
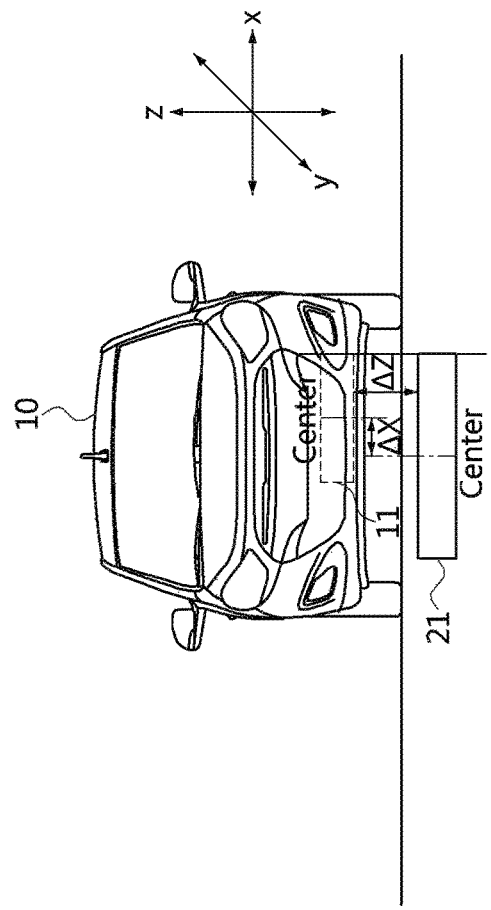
FIG. 3 is a conceptual diagram for explaining a concept of alignment in an EV wireless power transfer according to embodiments of the present disclosure.

FIG. 3 is a conceptual diagram for explaining a concept of alignment in an EV wireless power transfer according to embodiments of the present disclosure.

As shown in FIG. 3, a method of aligning the power transmission pad 21 and the power reception pad 11 in the EV in FIG. 1 will be described. A positional alignment may correspond to the alignment, which is the above-mentioned term, and thus may be defined as a positional alignment between the GA and the VA, but is not limited to the alignment of the transmission pad and the reception pad. Although the transmission pad 21 is illustrated as positioned below a ground surface as shown in FIG. 3, the transmission pad 21 may also be positioned on the ground surface, or positioned such that a top portion surface of the transmission pad 21 is exposed below the ground surface.

The reception pad 11 of the EV may be defined by different categories according to its heights (defined in the z-direction) measured from the ground surface. For example, a class 1 for reception pads having a height of 100-150 millimeters (mm) from the ground surface, a class 2 for reception pads having a height of 140-210 mm, and a class 3 for reception pads having a height of 170-250 mm may be defined. Here, the reception pad may support a part of the above-described classes 1 to 3. For example, only the class 1 may be supported according to the type of the reception pad 11, or the class 1 and 2 may be supported according to the type of the reception pad 11. The height of the reception pad measured from the ground surface may correspond to the previously defined term "vehicle magnetic ground clearance".

Further, the position of the power transmission pad 21 in the height direction (i.e., defined in the z-direction) may be determined to be located between the maximum class and the minimum class supported by the power reception pad 11. For example, when the reception pad supports only the class 1 and 2, the position of the power transmission pad 21 may be determined between 100 and 210 mm with respect to the power reception pad 11.

Still further, a gap between the center of the power transmission pad 21 and the center of the power reception pad 11 may be determined to be located within the limits of the horizontal and vertical directions (defined in the x- and y-directions). For example, it may be determined to be located within ±75 mm in the horizontal direction (defined in the x-direction), and within ±100 mm in the vertical direction (defined in the y-direction). The relative positions of the power transmission pad 14 and the power reception pad 11 may be varied in accordance with their experimental results, and the numerical values should be understood as exemplary.

Figure 4:
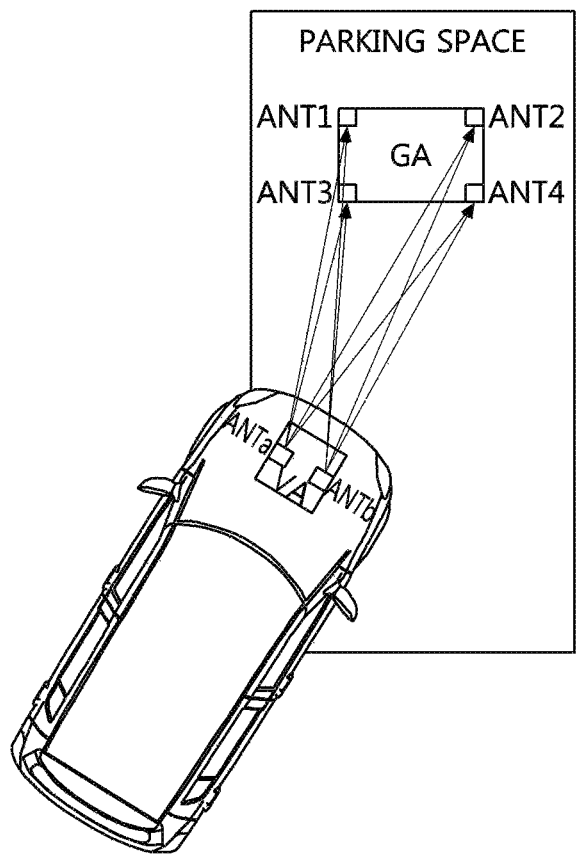
FIG. 4 is a conceptual diagram for explaining a position alignment method according to embodiments of the present disclosure.

FIG. 4 is a conceptual diagram for explaining a position alignment method according to embodiments of the present disclosure.

As shown in FIG. 4, a position alignment method according to embodiments of the present disclosure, as a method for maximizing and/or optimizing WPT efficiency by aligning positions of the primary coil of the GA and the secondary coil of the VA, may be performed based on magnetic field measurements between four antennas ANT1, ANT2, ANT3, and ANT4 in the GA side and two antennas ANTa and ANTb in the VA side.

More specifically, the VA may include two antennas which are located in the left and right regions of the VA respectively. Also, the left region and the right region may mean regions into which the VA is divided symmetrically. In case that the VA has a rectangular structure, the two antennas may be respectively located at the left side center and the right side center of the rectangle, but the structure is not limited to the rectangle structure because the structure may be changed according to various designs.

Also, the two antennas may be located in a specific portion of the vehicle with respect to the VA, in which case they may be located respectively in the left and right regions of the specific portion of the vehicle. The left region and the right region of the specific portions of the vehicle may refer to regions into which the specific portion of the vehicle is divided symmetrically.

The above-described left region and right region of the specific portion of the VA may be the front region and the rear region of the vehicle, but not limited thereto, and may mean two regions divided symmetrically. Hereinafter, it will be assumed that they are located in the VA.

The VA or the VA controller may include a position alignment apparatus which controls the antennas and calculate information on a positional difference (hereinafter, simply referred to as "positional difference information") between the VA and the GA.

The GA may include four antennas, and the four antennas may be located in the first, second, third and fourth regions of the GA, respectively, and the first region, the second region, the third region, and the fourth region may mean the upper left region, the upper right region, the lower left region, and the lower right region of the GA, respectively, but not limited thereto, may mean regions which are quadrants into which the GA is divided so as to have the same size. In case that the GA has a rectangular structure, the four antennas may be located at each corner of the rectangular structure, but the structure is not limited to the rectangle because the structure may be changed according to various designs. Also, the GA or the GA controller may also include a magnetic field detection apparatus capable of calculating magnetic field measurement values based on magnetic fields detected by the four antennas and transmitting the magnetic field measurement values to the position alignment apparatus.

Here, each of the antennas included in the VA and/or the GA may be a loop antenna or a ferrite rod antenna, but embodiments of the present disclosure are not limited thereto.

The ferrite rod antenna may refer to an antenna using low frequencies. Here, the low-frequency may mean a low-frequency (LF) band using a band of 30 to 300 kHz among 12 frequency ranges classified by the International Telecommunication Union (ITU). Table 1 below shows the 12 ranges classified by the ITU.

TABLE 1

| | Abbreviation | Frequency range | Wavelength range |
|---|---|---|---|
| 1 | ELF | 3~30 Hz | 100,000~10,000 km |
| 2 | SLF | 30~300 Hz | 10,000~1000 km |
| 3 | ULF | 300~3000 Hz | 1000~100 km |
| 4 | VLF | 3~30 kHz | 100~10 km |
| 5 | LF | 30~300 kHz | 10~1 km |
| 6 | MF | 300~3000 kHz | 1000~100 m |
| 7 | HF | 3~30 MHz | 100~10 m |
| 8 | VHP | 30~300 MHz | 10~1 m |
| 9 | UHF | 300~3000 MHz | 1~0.1 m |
| 10 | SHF | 3~30 GHz | 100~10 mm |
| 11 | EHF | 30~300 GHz | 10~1 mm |
| 12 | THF | 300~3000 GHz | 1~0.1 mm |

Before describing a position alignment apparatus according to embodiments of the present disclosure, a loop antenna and a ferrite rod antenna which may be used in the position alignment apparatus will be described with reference to FIGS. 5 to 8.

Figure 5A:
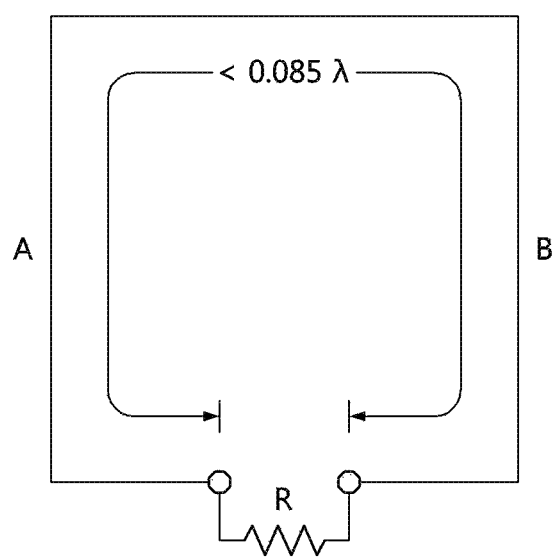
FIGS. 5A and 5B are conceptual diagrams illustrating a loop antenna.
Figure 5B:
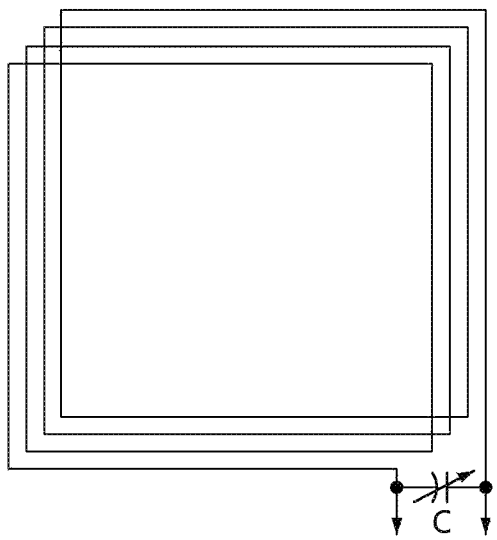

FIGS. 5A and 5B are conceptual diagrams illustrating a loop antenna.

Specifically, FIG. 5A illustrates a loop antenna with a single winding, and FIG. 5B illustrates a loop antenna with a plurality of windings.

The loop antenna may refer to an antenna that includes a closed-circuit. The loop antenna is advantageous in that it is simple in structure, low in cost, and easy to change the shape thereof, so that various types of antennas can be manufactured. The various structures may include, but are not limited to, circular, triangular, square, elliptical, and the like. Also, a loop antenna may be generally classified as an electrically small loop antenna when its circumference is less than 0.1 times its wavelength, and the other may be classified as an electrically large loop antenna.

Since the loop antenna illustrated in FIG. 5A has only one winding, and the length of the circumference is less than 0.085 times the wavelength, so that it may be classified as the electrically small loop antenna. Also, the loop antenna illustrated in FIG. 5A may have a very low radiation resistance. That is, the radiation resistance may be less than 1 ohm, but the radiation resistance can be improved by increasing the number of windings.

The loop antenna illustrated in FIG. 5A may have a narrow bandwidth with the small loop, and may typically have a bandwidth of less than 1%. The loop antenna may have a far field pattern similar to a small electrical dipole perpendicular to a loop plane, and may be equivalent to a magnetic dipole. Also, the loop antenna may further improve the radiation resistance by inserting a ferromagnetic core.

The loop antenna illustrated in FIG. 5B is a loop antenna having a plurality of windings, in which the radiation resistance can be improved, but the efficiency may be very low. The loop antenna having a plurality of windings may be used as a reception antenna in most cases, and loss may not be significant.

The small loop antenna may have a high number of windings and a high radiation resistance by inserting a ferrite core, but it may have a high loss and a low radiation efficiency. However, the small loop antenna is advantageous in that it has a simple structure, small size and weight.

Figure 6A:
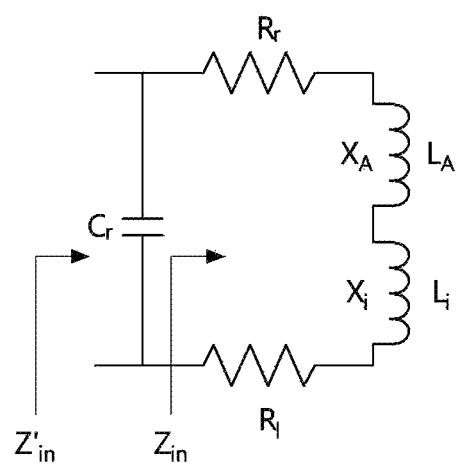
FIGS. 6A and 6B are conceptual diagrams illustrating equivalent circuits of a loop antenna.
Figure 6B:
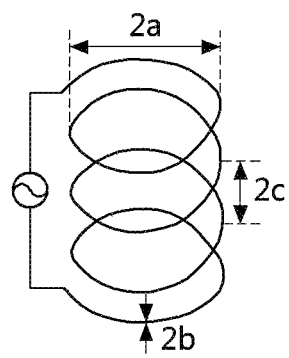

FIGS. 6A and 6B are conceptual diagrams illustrating equivalent circuits of a loop antenna.

Specifically, FIG. 6A illustrates an equivalent circuit of a loop antenna, and FIG. 6B explains a loss resistance in the equivalent circuit of the loop antenna.

In the equivalent circuit of FIG. 6A, $C_r$ may represent a resonance capacitance, $R_l$ may represent a loss resistance of the loop antenna, and $R_r$ may represent a radiation resistance. Also, $L_A$ may represent an inductance of the loop, and $X_A$ may represent a reactance of $L_A$. $L_i$ may represent an inductance of a conductor (wire) of the loop, and $X_i$ may represent a reactance of $L_i$. Also, $Z_{in}$ may represent an input impedance, and $Z'_{in}$ may represent an impedance of a conjugate matching relationship with $Z_{in}$.

The input impedance $Z_{in}$, the impedance $Z'_{in}$ of the conjugate matching relationship with the input impedances $Z_{in}$, an admittance $Y_{in}$ equivalent to the input impedance $Z_{in}$, and the resonance capacitance $C_r$ may be calculated as shown in Equation 1 below.

$$Z_{in} = R_{in} + jX_{in} = (R_r + R_L) + j(X_A + X_i) \quad \text{[Equation 1]}$$

$$Y_{in} = G_{in} + jB_{in} = \frac{1}{Z_{in}} = \frac{R_{in}}{R_{in}^2 + X_{in}^2} - j\frac{X_{in}}{R_{in}^2 + X_{in}^2}$$

$$Z'_{in} = R'_{in} = \frac{1}{G_{in}} = \frac{R_{in}^2 + X_{in}^2}{R_{in}} = R_{in} + \frac{X_{in}^2}{R_{in}}$$

$$C_r = -\frac{B_{in}}{2\pi f} = \frac{1}{2\pi f}\frac{X_{in}}{R_{in}^2 + X_{in}^2}$$

In Equation 1, f may represent a frequency, and $G_{in}$ and $B_{in}$ may represent a conductance and a susceptance of the admittance $Y_{in}$, respectively.

As described above, FIG. 6A is a view for explaining the value of the loss resistance $R_l$. In FIG. 6A, $2a$ may represent the diameter of the loop, $2b$ may represent the diameter of the wire, $2c$ may represent the spacing between each winding.

Referring to FIGS. 6A and 6B, $R_1$ may be calculated as Equation 2 in consideration of the loop and a proximity effect.

$$R_l = \frac{Na}{b}R_s\left(\frac{R_P}{R_0} + 1\right) \quad \text{[Equation 2]}$$

-continued $$R_S \sqrt{\frac{\omega \mu_0}{2\sigma}}$$

$$R_0 = \frac{NR_s}{2\pi b}$$

In Equation 2, $R_S$ may represent a surface resistance, $R_P$ may represent an ohm resistance per unit length according to the proximity effect, $R_O$ may represent a unit resistance per unit length according to a skin effect. N may represent the number of windings, and the surface resistance $R_S$ may be determined according to characteristics of the wire. Also, in the loop antenna having a single winding, a loop inductance of a circular loop antenna, and a loop inductance and a loop internal reactance of a rectangular loop antenna may be calculated as shown in Equation 3.

$$L_{A1}^{circ} = \mu a \left[ \ln\left(\frac{8a}{b}\right) - 2 \right]$$ [Equation 3]

$$L_{A1}^{sq} = 2\mu \frac{a}{\pi} \left[ \ln\left(\frac{a}{b}\right) - 0.774 \right]$$

$$L_i = \frac{a}{\omega b} \sqrt{\frac{\omega \mu_0}{2\sigma}}$$

In the loop inductance of the circular loop antenna $L_{A1}^{circ}$ of Equation 3, a may represent the radius of the loop, b may represent the radius of the wire, and μ may represent the permeability. In the loop inductance of the rectangular loop antenna $L_{A1}^{sq}$ of Equation 3, a may represent the length of one side, b may represent the radius of the wire, and μ may represent the permeability. In the loop internal reactance Li of Equation 3, a may represent the radius of the loop, b may represent the radius of the wire, and ω may represent an angular frequency. Also, σ may represent the electrical conductivity of the wire, and $\mu_0$ may represent the permeability in free space.

Figure 7A:
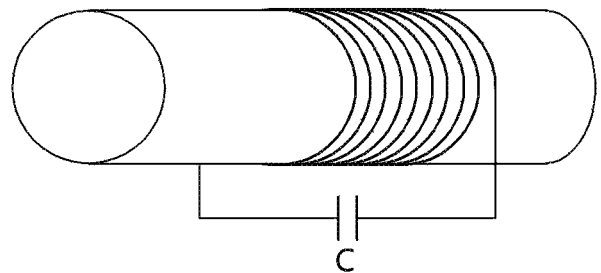
FIG. 7A is a conceptual diagram illustrating a ferrite rod antenna.
Figure 7B:
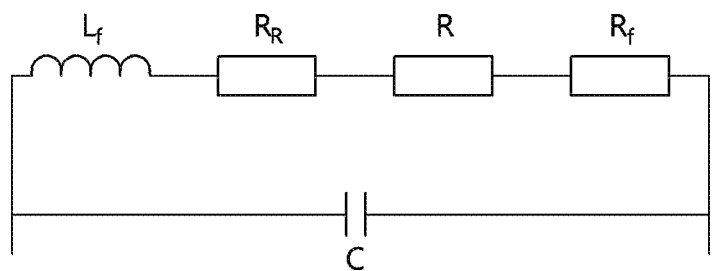
FIG. 7B is a circuit diagram illustrating an equivalent circuit of a ferrite rod antenna.

FIG. 7A is a conceptual diagram illustrating a ferrite rod antenna, and FIG. 7B is a circuit diagram illustrating an equivalent circuit of a ferrite rod antenna.

Specifically, FIG. 7A illustrates a ferrite rod loop antenna, and FIG. 7B illustrates an equivalent circuit of the ferrite rod loop antenna.

A small magnetic wave loop antenna may improve the radiation resistance and radiation efficiency by inserting a ferrite core having a high magnetic permeability. Also, the small magnetic field loop antenna may have a large magnetic flux due to the high magnetic permeability, and may have a high induced voltage. The magnetic properties may be determined according to the magnetic permeability and the geometrical structure. Also, the magnetic flux may be expressed by an effective relative permeability.

The ferrite rod antenna having the ferrite core in FIG. 7A may be equivalent to the circuit of FIG. 7B.

Referring to FIG. 7B, an RLC resonance frequency of the equivalent circuit may be adjusted by adjusting a capacitance of a capacitor. In FIG. 7B, the resonance frequency $f_0$, the inductance of the ferrite core coil $L_f$, and the quality factor Q may be calculated as shown in Equation 4.

$$f_0 = \frac{1}{2\pi} \sqrt{\frac{1}{L_f C}}$$ [Equation 4]

$$L_f = \mu_0 \mu_e N^2 \frac{A}{l_f}$$

$$A = \pi r_f^2$$

$$Q = \frac{2\pi f_0 L_f}{R + R_R + R_f} = \frac{f_0}{\Delta f_{hp}}$$

In Equation 4, C may represent the capacitance of the capacitor, $\mu_0$ may represent the permeability in free space, and $\mu_e$ may represent the relative permeability according to the length, radius, size and position of the ferrite rod, and N may represent the number of windings. Also, $L_f$ may represent the length of the ferrite rod, $r_f$ may represent the radius of the ferrite rod, and $\Delta f_{hp}$ may represent the frequency of half-power half-bandwidth.

Figure 8:
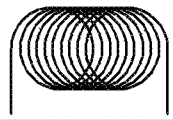
FIG. 8 is a view illustrating shapes of loop antennas and radiation resistances of loop antennas according to embodiments of the present disclosure.
Figure 8:
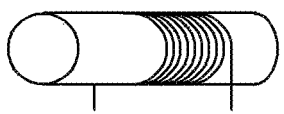

FIG. 8 is a view for explaining shapes of loop antennas and radiation resistances of loop antennas according to embodiments of the present disclosure.

Referring to FIG. 8, it can be seen that a radiation resistance of a loop antenna having a ferrite core is higher than that of a loop antenna having an empty core which is a free space.

The ferrite rod antenna may be used for vehicles, portable radios, aircrafts, and the like due to its reduced size, have little reflection, and have good range control with a modest reduction in field strength. Also, the ferrite rod antenna may have a high permeability, may require a low quiescent current according to a resonant frequency input stage, and may be less susceptible to detuning compared to high frequencies. However, since a Q-factor of the ferrite rod antenna is very high, the ferrite rod antenna can filter a part of the required signal modulation.

Hereinafter, a position alignment apparatus according to an embodiment of the present disclosure for which the ferrite core antenna described above can be used will be described.

Figure 9:
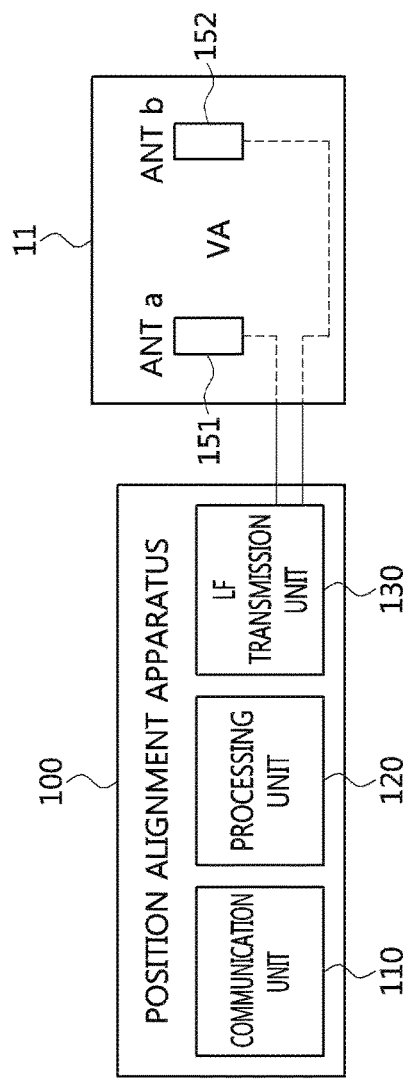
FIG. 9 is a block diagram illustrating a position alignment apparatus connected to a VA according to embodiments of the present disclosure.

FIG. 9 is a block diagram illustrating a position alignment apparatus connected to a VA according to embodiments of the present disclosure.

As shown in FIG. 9, a position alignment apparatus 100 connected to a VA 11, according to embodiments of the present disclosure, may comprise a communication unit 110, a processing unit 120, and an LF transmission unit 130. In case that the VA has a rectangular structure, the LF transmission unit 130 of the position alignment apparatus 100 may be connected to an antenna ANTa 151 at the center of the left side of the rectangular structure and an antenna ANTb 152 at the center of the right side of the rectangular structure. However, since the structure of the VA may be changed according to its design, the structure of the VA is not limited to the rectangular structure, and the positions of the antennas may be changed accordingly. Here, the components of the position alignment apparatus 100 are not limited to their names, but may be defined by their functions. Also, a plurality of the functions may be performed by a component, and a plurality of the components may perform one of the functions.

The communication unit 110 may include a communication module capable of communicating with a magnetic field detection apparatus 200 to be described later. Here, the communication module may include a communication module capable of performing WIFI communications, and may include a communication module capable of performing 3G communications and 4G communications, but embodiments of the present disclosure are not limited thereto. The communication unit 110 may search a parking space where the GA is located through the communication module and may establish a communication connection with the magnetic field detecting apparatus 200 connected to the corresponding GA to align the positions of the GA and VA. Also, the communication unit 110 may measure at least one of a received signal strength indicator (RSSI), a time of flight (ToF), a time difference of flight (TDoF), a time of arrival (ToA), and a time difference of arrival (TDoA). The operations related to the searching and selection of the parking space will be described later in detail with reference to FIGS. 13 and 14.

The processing unit 120 may verify whether the antennas connected to the LF transmission unit 130 described below operate normally, drive the antennas, compare magnetic field measurement values received by the communication unit 110 with previously-stored reference values, and calculate positional difference information between the GA and the VA based on the comparison result.

The LF transmission unit 130 may verify whether the connected antennas operate normally according to the operation of the processing unit 120, and may drive the antennas. The operations of the communication unit 110, the processing unit 120, and the LF transmission unit 130 according to embodiments of the present disclosure will be described later in detail with reference to FIG. 11.

The position alignment apparatus 100 according embodiments of the present disclosure may include at least one processor and a memory storing a program code including at least one instruction through which the above-described operations are performed. Here, the processor may execute the program code stored in the memory and may be a central processing unit (CPU), a graphics processing unit (GPU), or a dedicated processor. The memory may be constituted by a volatile storage medium and/or a non-volatile storage medium, and may be composed of a read only memory (ROM) and/or a random access memory (RAM).

Figure 10:
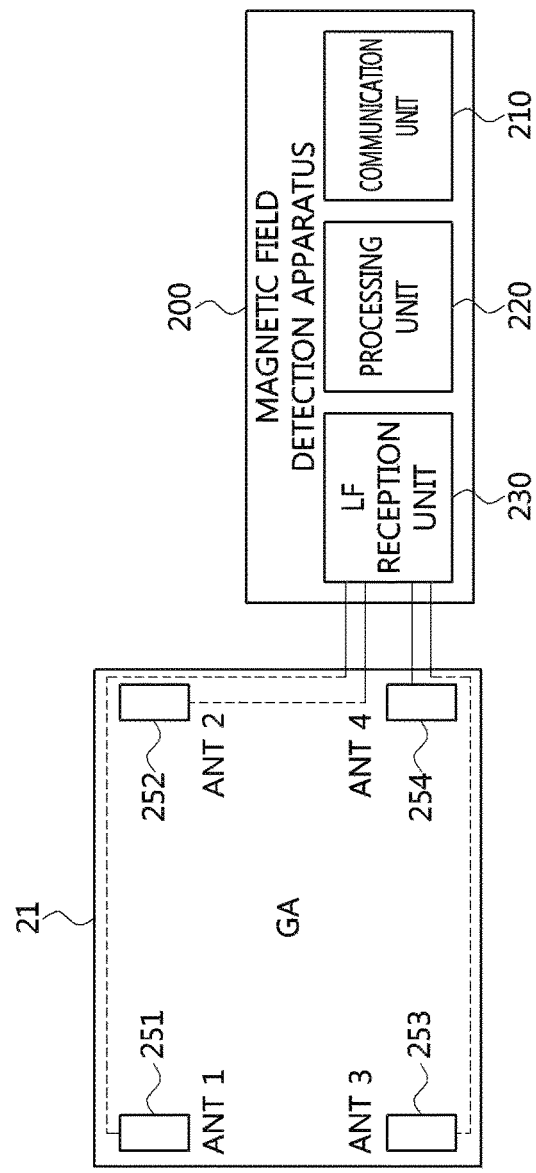
FIG. 10 is a block diagram illustrating a magnetic field detection apparatus connected to a GA according to embodiments of the present disclosure.

FIG. 10 is a block diagram illustrating a magnetic field detection apparatus connected to a GA according to embodiments of the present disclosure.

As shown in FIG. 10, a magnetic field detection apparatus 200 connected to a GA 21, according to embodiments of the present disclosure, may comprise a communication unit 210, a processing unit 220, and an LF reception unit 230. In case that the GA has a rectangular structure, each of four antennas ANT1 251, ANT2 252, ANT3 253, and ANT4 254 may be connected to the corresponding corner of the rectangular structure. However, since the structure of the GA may be changed according to various designs, the positions of the antennas may be changed accordingly. Here, the components of the magnetic field detection apparatus 200 are not limited to their names, but may be defined by their functions. Also, a plurality of the functions may be performed by a component, and a plurality of the components may perform one of the functions.

The communication unit 210 may include a communication module capable of communicating with the position alignment apparatus 100. Here, the communication module may include a communication module capable of performing WIFI communications, and may include a communication module capable of performing 3G communications and 4G communications, but embodiments of the present disclosure are not limited thereto. The communication unit 210 may transmit parking space information through the communication module to the VA. The operation of providing the parking space information will be described later in detail with reference to FIG. 13 and FIG. 14.

Also, the communication unit 210 may be connected to the position alignment apparatus 100 to align the positions of GA and VA and may transmit the magnetic field measurement values measured by the processing unit 220 to the position alignment apparatus 100.

The processing unit 220 may measure the magnetic field measurement values based on magnetic fields detected by the LF reception unit 230 to be described later. Here, since the magnetic field may exist for each antenna, the four antennas ANT1, ANT2, ANT3, and ANT4 may detect magnetic fields from the two antennas ANTa and ANTb connected to the position alignment apparatus 100 so that there can be eight magnetic fields. Also, the processing unit 220 may measure four magnetic field measurement values with respect to the four antennas ANT1, ANT2, ANT3, and ANT4 based on the eight magnetic fields. The magnetic field measurement values will be described later in detail with reference to FIG. 15 and FIG. 16. The processing unit 220 may provide the four magnetic field measurement values to the communication unit 210.

The LF reception unit 230 may be connected to four antennas ANT1, ANT2, ANT3, and ANT4 located in the GA, and may obtain information on magnetic fields radiated by the two antennas ANTa and ANTb of the position alignment apparatus 100, which are detected by the four antennas. The LF reception unit 230 may provide the obtained information on the magnetic fields to the processing unit 220.

The magnetic field detection apparatus 200 according to an embodiment of the present disclosure may include at least one processor and a memory storing code including program instructions through which the above-described operations are performed. Here, the processor may execute the program instructions stored in the memory and may be a central processing unit (CPU), a graphics processing unit (GPU), or a dedicated processor. The memory may be constituted by a volatile storage medium and/or a non-volatile storage medium, and may be composed of a read only memory (ROM) and/or a random access memory (RAM).

Figure 11:
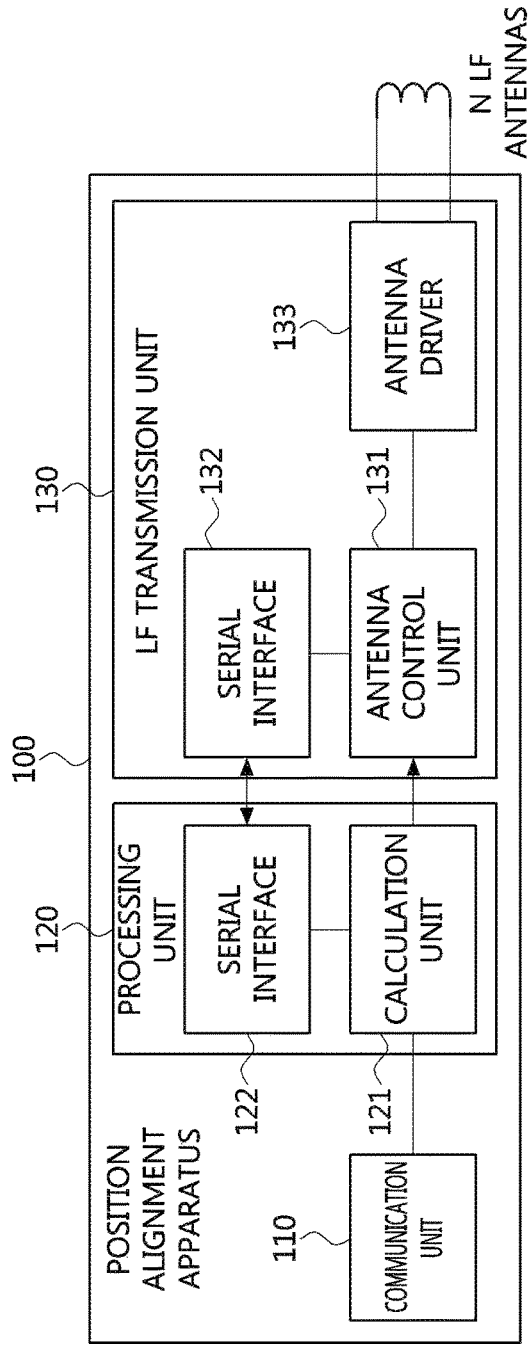
FIG. 11 is a detailed block diagram illustrating a position alignment apparatus according to embodiments of the present disclosure.

FIG. 11 is a detailed block diagram illustrating a position alignment apparatus according to embodiments of the present disclosure.

As shown in FIG. 11, the processing unit 120 of the position alignment apparatus 100 according to embodiments of the present disclosure may comprise a calculation unit 121 and a serial interface 122. The LF transmission unit 130 may comprise an antenna control unit 131, a serial interface 132, and an antenna driver 133. Also, the antenna driver 133 may be connected to at least one antenna. Here, the components of the processing unit 120 and the LF transmission unit 130 are not limited to their names, but may be defined by their functions. Also, a plurality of the functions may be performed by a component, and a plurality of the components may perform one of the functions.

When the calculation unit 121 is connected to the magnetic field detection apparatus 200 connected to the specific GA through the communication unit 110, the calculation unit 121 may provide LF data to the antenna control unit 131 to be described later so that the antenna control unit 131 drives the antennas. However, it is possible to verify whether the serial interface 122 to be described later is driven normally before the LF data of the calculation unit 121 is provided. Here, the LF data may include a preamble, a synchronization signal, and a wake up ID.

Also, the calculation unit 121 may calculate the positional difference information between the GA and the VA using the four magnetic field measurement values received by the communication unit 110. In other words, the calculation unit 121 may calculate the positional difference information based on respective differences among the four magnetic field measurement values and the previously-stored reference values. Here, the previously-stored reference values may refer to magnetic field measurement values measured when the GA and the VA are located in ideal positions, and the previously-stored reference values may include four values each of which corresponds to each of the received four magnetic field measurement values.

The positional difference information calculated by the calculation unit 121 may include a separation distance between the GA and the VA on an x-axis basis, a separation distance between the GA and the VA on a y-axis basis, and a separation distance between the GA and the VA on a z-axis basis. Also, the positional difference information may include a separation distance between the GA and the VA on an x-axis basis, and a separation distance between the GA and the VA and an angle (i.e., torsional degree) on a y-axis basis. Here, the x-axis may indicate the horizontal direction with respect to the reception pad, the y-axis may indicate the vertical direction with respect to the reception pad, and the z-axis may indicate the direction perpendicular to the reception pad. Also, the angle may indicate the torsional degree between the transverse direction of the reception pad and the transverse direction of the transmission pad. However, embodiments of the present disclosure are not limited thereto, and when a specific criterion is set, the angled may be defined according to the specific criterion.

The calculation unit 121 may provide the calculated positional difference information to a user (e.g., a driver of the vehicle), and the user may determine a parking position of the vehicle so that the position between the GA and the VA is aligned with reference to the positional difference information. The calculation unit 121 may generate an image or a video based on the calculated positional difference information and provide the generated image or video to the user, but the method of providing the positional difference information to the user is not limited thereto.

The serial interface 122 of the processing unit 120 may verify whether at least one antenna operates normally before providing the LF data for driving the antennas. The serial interface 122 of the processing unit 120 may perform a Serial Peripheral Interface (SPI) communication with the serial interface 132 of the LF transmission unit 130 for verification. In other words, the serial interface 122 of the processing unit 120 may transmit SPI data to the serial interface 132 of the LF transmission unit 130 and receive SPI data from the serial interface 132 of the LF transmission unit 130. Based on the exchanged SPI data, the serial interfaces 122 and 132 may verify whether the antennas are normally driven. When the antennas operate normally, the LF data for driving the antennas may be provided by the calculation unit 121. However, when the antennas do not operate normally, the serial interface 122 of the processing unit 120 may perform internal diagnostics. That is, the SPI data may be an enable signal for verifying whether or not the antennas operate normally.

The antenna control unit 131 may control at least one antenna through the antenna driver 133 when the LF data is received from the computing unit 121. As described above, the antenna control unit 131 may also control driving of the antenna through the antenna driver 133 in order to verify whether the antenna is normally driven according to a request of the serial interface 132 of the LF transmission unit 130.

When the serial interface 132 of the LF transmission unit 130 receives the SPI data from the serial interface 122 of the processing unit 120, the serial interface 132 may verify whether the antennas operate normally through the antenna control unit 131 and/or the antenna driver 133. Also, the serial interface 132 of the LF transmission unit 130 may transmit the verification result to the serial interface 122 of the processing unit 120.

The antenna driver 133 may be connected to at least one antenna and may drive the at least one antenna according to a signal from the antenna control unit 131. Here, the at least one antenna may be a ferrite rod antenna that outputs a magnetic field having a low-frequency band of 100 kHz to 150 kHz and having a radius of about 5 m, but is not limited thereto. Also, the at least one antenna may output a unique magnetic field.

Figure 12:
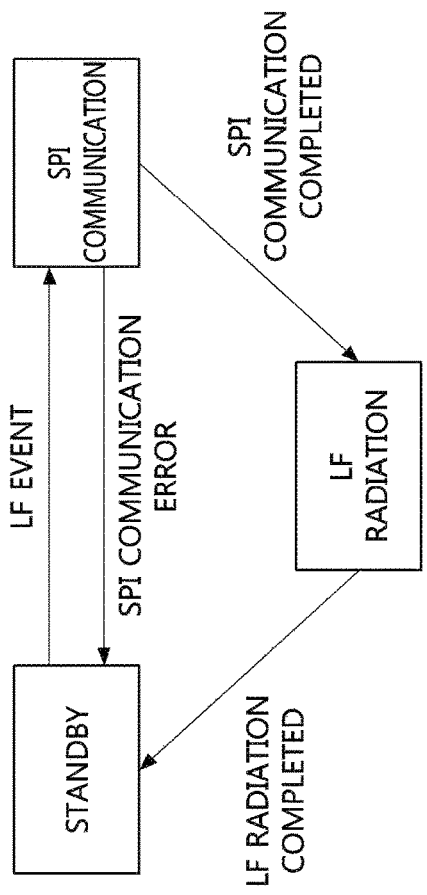
FIG. 12 is a view illustrating a state transition of a position alignment apparatus according to embodiments of the present disclosure.

FIG. 12 is a view illustrating a state transition of a position alignment apparatus according to embodiments of the present disclosure.

As shown in FIG. 12, the position alignment apparatus 100 according to embodiments of the present disclosure may basically maintain a standby state. After performing a connection with the magnetic field detection apparatus 200, the position alignment apparatus 100 in the standby state may determine that an event (LF event) to radiate a magnetic field by using the antenna occurs, and perform serial (SPI) communication between the serial interface 122 of the processing unit 120 and the serial interface 132 of the LF transmission unit 130. When an error occurs in the SPI communication, the position alignment apparatus 100 may return to the standby state. However, the position alignment apparatus 100 may not return to the standby state when the error is recovered through internal diagnosis and/or feedback and the SPI communication is completed. When the SPI communication is completed, the position alignment apparatus 100 may be in an LF radiation state for radiating a low-frequency magnetic field through the antenna, and if the position alignment apparatus 100 receives the magnetic field measurement values from the magnetic field detection apparatus 200, the position alignment apparatus 100 may return to the standby state. However, the event for returning from the LF radiation state to the standby state is not limited thereto, and may be defined according to the time or the number of repetitions.

Figure 13:
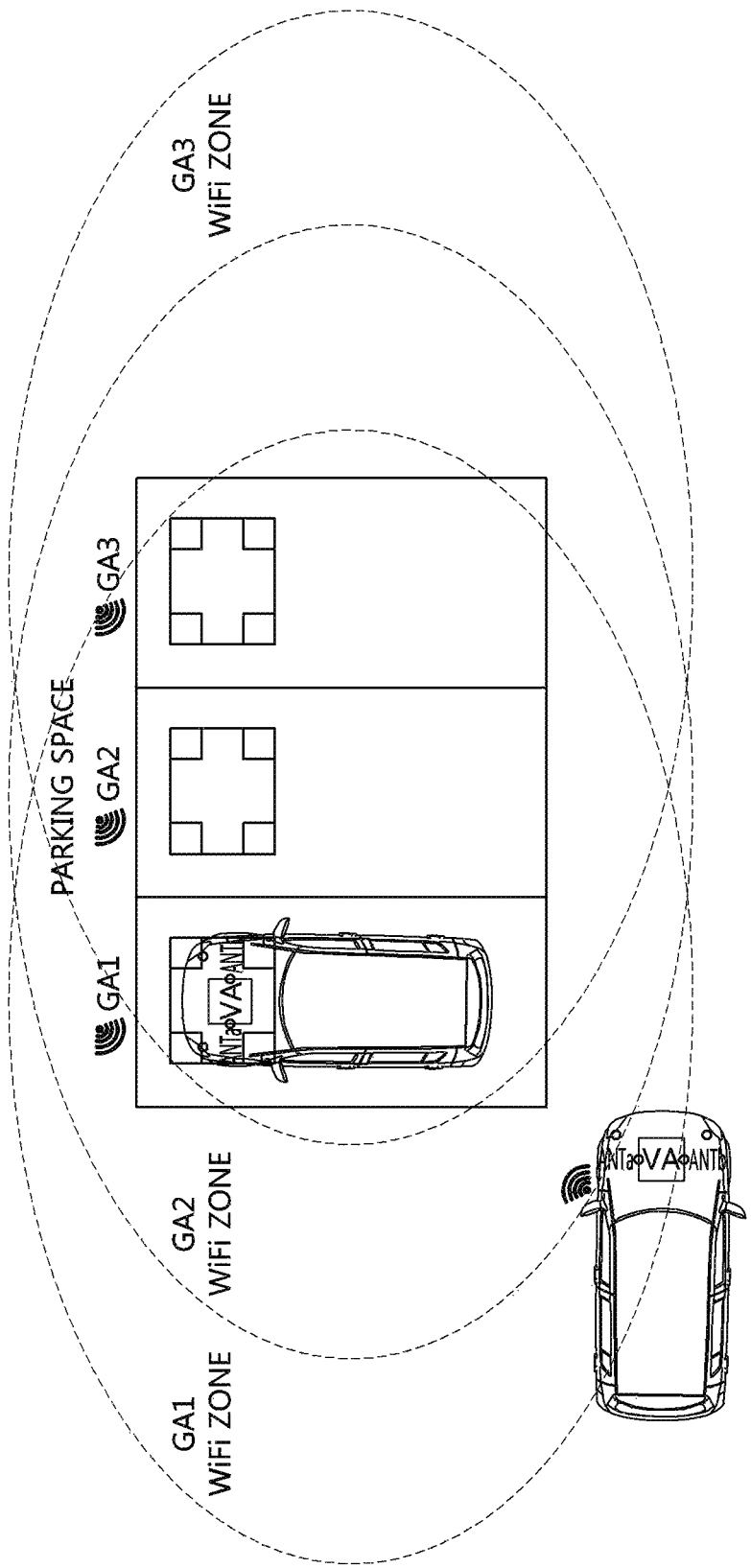
FIG. 13 is a conceptual diagram for explaining a method of searching for a parking space of a vehicle according to embodiments of the present disclosure.

FIG. 13 is a conceptual diagram for explaining a method of searching for a parking space of a vehicle according to embodiments of the present disclosure.

As shown in FIG. 13, a method for searching for a parking space of a vehicle according to an embodiment of the present disclosure may be performed by the communication unit 110 of the position alignment apparatus 100. However, in case that the VA includes another communication module, it may be performed by another communication module.

As described above, the communication unit 110 of the position alignment apparatus 100 may include a communication module capable of performing at least one of WiFi, 3G communication, 4G communication, and the like. However, in the present disclosure, for convenience of explanation, it is explained that the communication module performs Wifi communications.

The position alignment apparatus 100 may search for a parking space at a current vehicle position through WiFi communications and select one of the searched parking spaces. The selection of the parking space will be described later with reference to FIG. 14. Here, a method by which the position alignment apparatus 100 searches for the parking space may be started by the driver, and may be automatically performed, but embodiments of the present disclosure are not limited thereto. Also, the parking space search may be performed within a range of 100 meters.

Each parking space may include a GA, and each GA may include one magnetic field detection apparatus 200. Accordingly, each parking space may have a WiFi zone capable of providing the parking space information through the communication unit 210 of the magnetic field detection apparatus 200. Here, the WiFi zone may be generated by the communication unit 210 of the magnetic field detection apparatus 200, but may be performed by another communication module when the GA includes another communication module.

The communication unit 210 or another communication module of the magnetic field detection apparatus 200 may provide the communication unit 210 or another communication module of the position alignment apparatus 100 with presence of a vehicle in the current parking space. When the vehicle exists, the communication may not be performed. Only when the vehicle is not present, the communication may be performed. However, the method of providing the presence or absence of the vehicle is not limited thereto.

Figure 14:
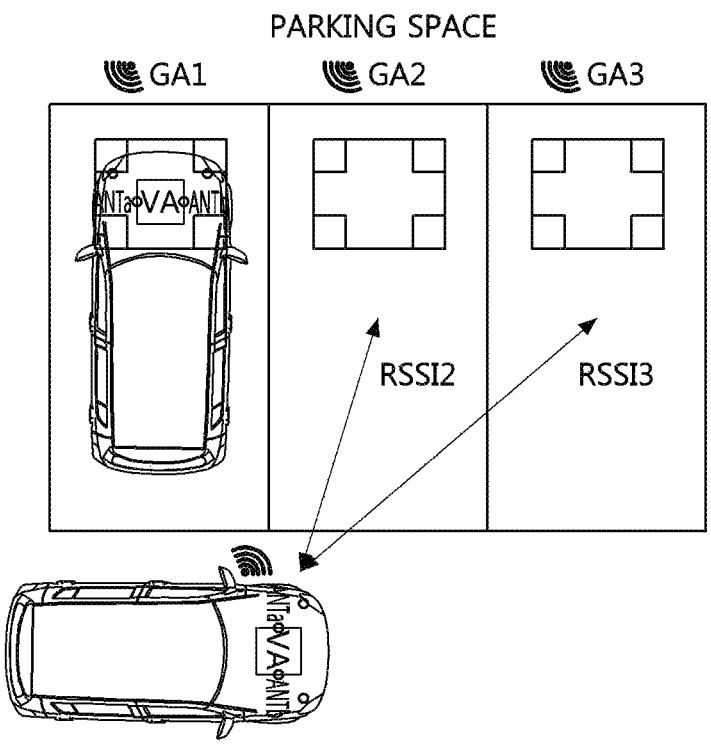
FIG. 14 is a conceptual diagram for explaining a method of selecting a parking space by a vehicle according to embodiments of the present disclosure.

FIG. 14 is a conceptual diagram for explaining a method of selecting a parking space by a vehicle according to embodiments of the present disclosure.

A method of selecting a parking space when a vehicle searches for a plurality of parking spaces according to embodiments of the present disclosure may use at least one of: a received signal strength indicator (RSSI), a time of flight (ToF), a time difference of flight (TDoF), a time of arrival (ToA), and a time difference of arrival (TDoA). Here, the RSSI may mean a value obtained by measuring a power present in a received radio signal, the ToF may mean a time required for propagation of a signal, and the TDoF may mean a difference between ToFs. Also, the ToA may mean a time at which a signal arrives, and the TDoA may mean a difference between ToAs.

Hereinafter, it is assumed that RSSI is used to select a parking space. In the case of using ToF and TDoF, a parking space may be selected similarly to the case of using the RSSI.

As shown in FIG. 14, the vehicle may receive a result that there are two parking spaces (e.g., GA2 and GA3) after searching for available parking spaces. In this case, the communication unit 110 of the position alignment apparatus 100 may measure RSSIs for two signals of the two parking spaces, and may select a parking space transmitting the signal with a larger RSSI. That is, the position alignment apparatus 100 may determine that GA2 is closer to the vehicle, and may select GA2 because RSSI2 for the signal of GA2 is greater than RSSI3 for the signal of GA3. That is, the position alignment apparatus 100 may select a GA having the largest RSSI when there are two or more parking spaces.

Then, the position alignment apparatus 100 may connect to the magnetic field detection apparatus 200 connected to the GA2 to drive the LF antennas, and the position alignment apparatus 100 may receive the magnetic field measurement values from the magnetic field detection apparatus 200 and output the positional difference information between the GA and the VA.

Figure 15:
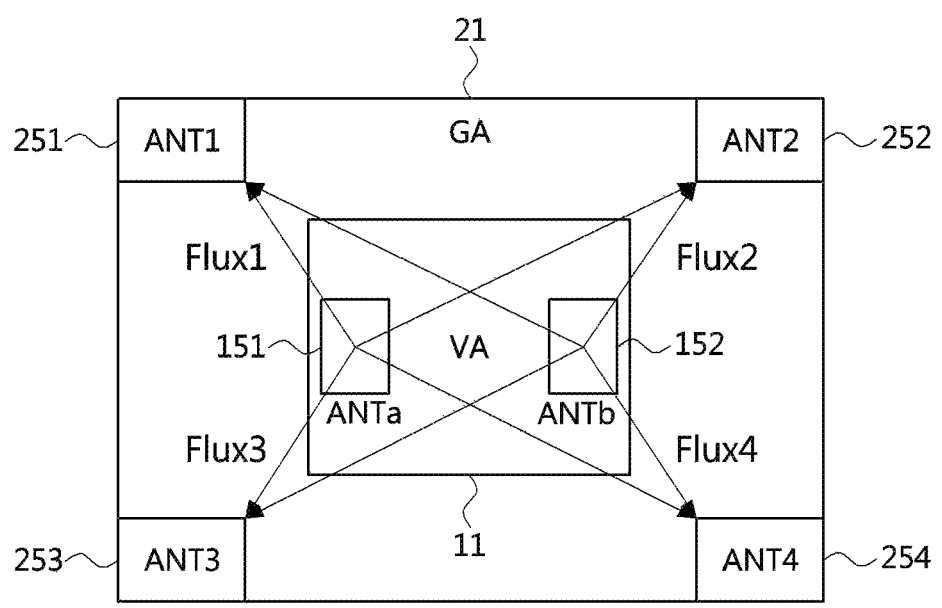
FIG. 15 is a conceptual diagram illustrating magnetic field signals between GA and VA located in ideal positions according to embodiments of the present disclosure.

FIG. 15 is a conceptual diagram illustrating magnetic field signals between GA and VA located in ideal positions according to embodiments of the present disclosure.

As shown in FIG. 15, in case that the GA and the VA are located in ideal positions, magnetic fields among four antennas ANT1, ANT2, ANT3, and ANT4 connected to the magnetic field detection apparatus 200 and two antennas ANTa and ANTb connected to the position alignment apparatus 100 will be described as follows.

The antenna ANT1 251 of the magnetic field detection apparatus 200 may detect Flux1 based on the magnetic field radiated by the antenna ANTa 151 of the position alignment apparatus 100 and the magnetic field radiated by the ANTb 152 of the position alignment apparatus 100. The antenna ANT2 252 of the magnetic field detection apparatus 200 may detect Flux2 based on the magnetic field radiated by the antenna ANTa 151 of the position alignment apparatus 100 and the magnetic field radiated by the ANT b 152 of the position alignment apparatus 100. Similarly, the antenna ANT3 253 of the magnetic field detection apparatus 200 may detect Flux3, and the ANT4 254 may detect Flux4. That is, Flux1 through Flux4 may be calculated as shown in Equation 5 below.

$$Flux1 = ANTa-ANT1 \& ANTb-ANT1$$

$$Flux2 = ANTa-ANT2 \& ANTb-ANT2$$

$$Flux3 = ANTa-ANT3 \& ANTb-ANT3$$

$$Flux4 = ANTa-ANT4 \& ANTb-ANT4 \qquad \text{[Equation 5]}$$

The position alignment apparatus 100 according to embodiments of the present disclosure may calculate the positional difference information between the GA and the VA on the basis of previously-stored reference values which are magnetic field measurement values at the ideal positions, and the above-described Flux1 through Flux4 may be used as the previously-stored reference values.

Figure 16:
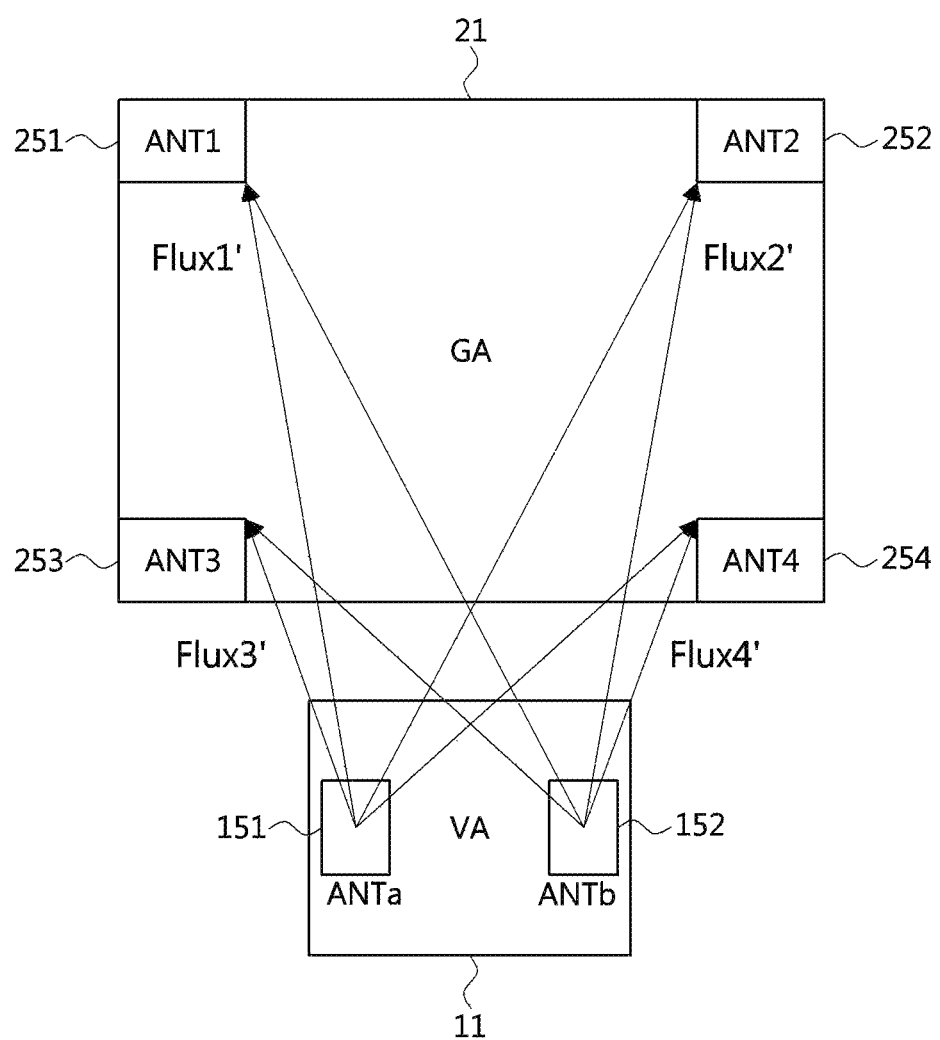
FIG. 16 is a conceptual diagram illustrating magnetic field signals between GA and VA located in misaligned positions according to embodiments of the present disclosure.

FIG. 16 is a conceptual diagram illustrating magnetic field signals between GA and VA located in misaligned positions according to embodiments of the present disclosure.

As shown in FIG. 16, in case that the GA and the VA are located in misaligned positions, magnetic fields among four antennas ANT1, ANT2, ANT3, and ANT4 connected to the magnetic field detection apparatus 200 and two antennas ANTa and ANTb connected to the position alignment apparatus 100 will be described as follows.

The antenna ANT1 251 of the magnetic field detection apparatus 200 may detect Flux1' based on the magnetic field radiated by the antenna ANTa 151 of the position alignment apparatus 100 and the magnetic field radiated by the ANTb 152 of the position alignment apparatus 100. The antenna ANT2 252 of the magnetic field detection apparatus 200 may detect Flux2' based on the magnetic field radiated by the antenna ANTa 151 of the position alignment apparatus 100 and the magnetic field radiated by the ANT b 152 of the position alignment apparatus 100. Similarly, the antenna ANT3 253 of the magnetic field detection apparatus 200 may detect Flux3', and the ANT4 254 may detect Flux4'. That is, Flux1' through Flux4' may be calculated as shown in Equation 6 below.

$$Flux1' = ANTa-ANT1 \& ANTb-ANT1$$

$$Flux2' = ANTa-ANT2 \& ANTb-ANT2$$

$$Flux3' = ANTa-ANT3 \& ANTb-ANT3$$

$$Flux4' = ANTa-ANT4 \& ANTb-ANT4 \qquad \text{[Equation 6]}$$

The magnetic field detection apparatus 200 may transmit the values of Flux1' to Flux4' according to the misaligned positions to the position alignment apparatus 100, and the position alignment apparatus 100 may calculate the positional difference information by the values of Flux1' to Flux4' and the values of Flux1 to Flux4.

That is, the calculation unit 121 of the position alignment apparatus 100 may calculate the positional difference information by performing a specific algorithm based on the values of Flux1' to Flux4' and the values of Flux1 to Flux4. Also, the calculation unit 121 may calculate the positional difference information based on a difference between Flux1 and Flux1', a difference between Flux2 and Flux2', a difference between Flux3 and Flux3', and a difference between Flux4 and Flux4'.

Also, the position alignment apparatus 100 may set a position separated by a certain, predefined offset between the GA and the VA as a reference position, and calculate the positional difference information based on reference magnetic field values according to the reference position and the current magnetic field measurement values. That is, the ideal positions of the GA or the VA may be variously set according to the structures of the GA and the VA.

FIG. 17 is a flowchart for explaining a position alignment method according to embodiments of the present disclosure.

As shown in FIG. 17, first, the position alignment apparatus 100 may search for a magnetic field detection apparatus connected to at least one GA, discover at least one magnetic field detection apparatus, and connect to one of the at least one discovered magnetic field detection apparatus (S1710). Here, the position alignment apparatus 100 may be configured to select and connect to the magnetic field detection apparatus based on at least one of RSSIs, ToFs, TDoFs, and the like of at least one searched magnetic field detection apparatuses. Thereafter, the position alignment apparatus 100 may verify whether the antennas operate normally by SPI communications (S1720). When the antennas operate normally, the position alignment apparatus 100 may drive each of the antennas to radiate a magnetic field (S1730). Here, each of the antennas may be a low-frequency antenna. Also, the position alignment apparatus 100 may receive magnetic field measurement values from the magnetic field detection apparatus 200 (S1740), perform a position estimation algorithm based on the received magnetic field measurement values and previously-stored reference values (S1750), and calculate and output positional difference information between the GA and the VA (S1760). The magnetic field measurement values may include four magnetic field measurement values calculated on the basis of information on magnetic fields detected by four antennas connected to the magnetic field detection apparatus 200.

The methods according to embodiments of the present disclosure, as described herein, may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for an exemplary embodiment of the present disclosure or can be publicly known and available to those who are skilled in the field of computer software.

Examples of the computer readable medium may include a hardware device including ROM, RAM, and flash memory, which are configured to store and execute the program instructions. Examples of the program instructions include machine codes made by, for example, a compiler, as well as high-level language codes executable by a computer, using an interpreter. The above exemplary hardware device can be configured to operate as at least one software module to perform the operation of the present disclosure, and vice versa.

While some aspects of the present disclosure have been described in the context of an apparatus, it may also represent a description according to a corresponding method, wherein the block or apparatus corresponds to a method step or a feature of the method step. Similarly, aspects described in the context of a method may also be represented by features of the corresponding block or item or corresponding device. Some or all of the method steps may be performed by (or using) a hardware device such as, for example, a microprocessor, a programmable computer, or an electronic circuit. In various exemplary embodiments, one or more of the most important method steps may be performed by such an apparatus.

In embodiments, a programmable logic device (e.g., a field programmable gate array (FPGA)) may be used to perform some or all of the functions of the methods described herein. In embodiments, the FPGA may operate in conjunction with a microprocessor to perform one of the methods described herein. Generally, the methods are preferably performed by some hardware device.

The foregoing descriptions of specific exemplary embodiments of the present disclosure have been presented for purposes of illustration and description. They are not intended to be exhaustive or to limit the disclosure to the precise forms disclosed, and obviously many modifications and variations are possible in light of the above teachings. The exemplary embodiments were chosen and described to explain certain principles of the disclosure and their practical application, to enable others skilled in the art to make and utilize various exemplary embodiments of the present disclosure, as well as various alternatives and modifications thereof. It is intended that the scope of the disclosure be defined by the claims appended hereto and their equivalents.

What is claimed is:

1. A position alignment method for position alignment between a position alignment apparatus including a reception pad and a magnetic field detection apparatus including a transmission pad which performs wireless power transfer (WPT), the position alignment method comprising:
   connecting, by the position alignment apparatus, to the magnetic field detection apparatus using wireless communication, wherein at least one antenna is located in the transmission pad;
   radiating, by the position alignment apparatus, at least one magnetic field using at least one antenna located in the reception pad;
   receiving, by the position alignment apparatus, magnetic field measurement values from the magnetic field detection apparatus; and
   obtaining, by the position alignment apparatus, information indicating a positional difference between the reception pad and the transmission pad by comparing the magnetic field measurement values with previously-stored reference values,
   wherein the at least one antenna located in the reception pad includes two antennas located in a first region and a second region, respectively, into which the reception pad is divided in a left-right direction,
   wherein the at least one antenna located in the transmission pad includes four antennas located in an upper left region, an upper right region, a lower left region, and a lower right region, respectively, wherein the upper left region, the upper right region, the lower left region, and the lower right region have a same size, and wherein the magnetic field measurement values include:
- a measurement value of a first magnetic flux detected by a first antenna of the four antennas in the transmission pad based on magnetic field radiated by a first antenna of the two antennas located in the reception pad and a second antenna of the two antennas located in the reception pad;
- a measurement value of a second magnetic flux detected by a second antenna of the four antennas in the transmission pad based on magnetic field radiated by the first antenna of the two antennas located in the reception pad and the second antenna of the two antennas located in the reception pad;
- a measurement value of a third magnetic flux detected by a third antenna of the four antennas in the transmission pad based on magnetic field radiated by the first antenna of the two antennas located in the reception pad and the second antenna of the two antennas located in the reception pad; and
- a measurement value of a fourth magnetic flux detected by a fourth antenna of the four antennas in the transmission pad based on magnetic field radiated by the first antenna of the two antennas located in the reception pad and the second antenna of the two antennas located in the reception pad.

2. The position alignment method according to claim 1, wherein the connecting to the magnetic field detection apparatus comprises:
- searching, by the position alignment apparatus, for a magnetic field detection apparatus within a predefined radius using wireless communication;
- discovering, by the position alignment apparatus, at least one magnetic field detection apparatus within the predefined radius;
- selecting, by the position alignment apparatus, one of the discovered at least one magnetic field detection apparatus based on at least one of: a received signal strength indicator (RSSI), a time of flight (ToF), a time difference of flight (TDoF), a time of arrival (ToA), and a time difference of arrival (TDoA); and
- connecting, by the position alignment apparatus, to the selected magnetic field detection apparatus.

3. The position alignment method according to claim 1, wherein the radiating of the at least one magnetic field comprises:
- determining, by the position alignment apparatus, whether the at least one antenna located in the reception pad operates normally; and
- driving, by the position alignment apparatus, the at least one antenna located in the reception pad to radiate the at least one magnetic field when the at least one antenna located in the reception pad operates normally.

4. The position alignment method according to claim 1, wherein the at least one antenna located in the reception pad and the at least one antenna located in the transmission pad are ferrite rod antennas using a low-frequency (LF) band.

5. The position alignment method according to claim 1, wherein the information indicating the positional difference between the reception pad and the transmission pad includes at least one of: a separation distance along an x-axis representing a horizontal direction with respect to the reception pad, a separation distance along a y-axis representing a vertical direction with respect to the reception pad, a separation distance along a z-axis representing a direction perpendicular to the reception pad, and a torsional degree between the horizontal direction of the reception pad and a horizontal direction of the transmission pad.

6. A position alignment apparatus for performing position alignment between the position alignment apparatus including a reception pad and a magnetic field detection apparatus including a transmission pad which performs wireless power transfer (WPT), the position alignment apparatus comprising:
- at least one antenna located in the reception pad;
- at least one processor; and
- a memory storing program instructions executed by the at least one processor, wherein, when the program instructions are executed, the at least one processor is configured to:
- connect to the magnetic field detection apparatus using wireless communication, wherein at least one antenna is located in the transmission pad;
- radiate at least one magnetic field using at least one antenna located in the reception pad;
- receive magnetic field measurement values from the magnetic field detection apparatus; and
- obtain information indicating a positional difference between the reception pad and the transmission pad by comparing the magnetic field measurement values with previously-stored reference values, wherein the at least one antenna located in the reception pad includes two antennas located in a first region and a second region, respectively, into which the reception pad is divided in a left-right direction, wherein the at least one antenna located in the transmission pad includes four antennas located in an upper left region, an upper right region, a lower left region, and a lower right region, respectively, wherein the upper left region, the upper right region, the lower left region, and the lower right region have a same size, and wherein the magnetic field measurement values include:
- a measurement value of a first magnetic flux detected by a first antenna of the four antennas in the transmission pad based on magnetic field radiated by a first antenna of the two antennas located in the reception pad and a second antenna of the two antennas located in the reception pad;
- a measurement value of a second magnetic flux detected by a second antenna of the four antennas in the transmission pad based on magnetic field radiated by the first antenna of the two antennas located in the reception pad and the second antenna of the two antennas located in the reception pad;
- a measurement value of a third magnetic flux detected by a third antenna of the four antennas in the transmission pad based on magnetic field radiated by the first antenna of the two antennas located in the reception pad and the second antenna of the two antennas located in the reception pad; and
- a measurement value of a fourth magnetic flux detected by a fourth antenna of the four antennas in the transmission pad based on magnetic field radiated by the first antenna of the two antennas located in the reception pad and the second antenna of the two antennas located in the reception pad.

7. The position alignment apparatus according to claim 6, wherein the at least one processor is further configured to:
- search for a magnetic field detection apparatus within a predefined radius using wireless communication;

discover at least one magnetic field detection apparatus within the predefined radius;

select one of the discovered at least one magnetic field detection apparatus based on at least one of: a received signal strength indicator (RSSI), a time of flight (ToF), a time difference of flight (TDoF), a time of arrival (ToA), and a time difference of arrival (TDoA); and connect to the selected magnetic field detection apparatus.

8. The position alignment apparatus according to claim 6, wherein the at least one processor is further configured to:

determine whether the at least one antenna located in the reception pad operates normally; and drive the at least one antenna located in the reception pad to radiate the at least one magnetic field when the at least one antenna located in the reception pad operates normally.

9. The position alignment apparatus according to claim 6, wherein the at least one antenna located in the reception pad and the at least one antenna located in the transmission pad are ferrite rod antennas using a low-frequency (LF) band.

10. The position alignment apparatus according to claim 6, wherein the information indicating the positional difference between the reception pad and the transmission pad includes at least one of: a separation distance along an x-axis representing a horizontal direction with respect to the reception pad, a separation distance along a y-axis representing a vertical direction with respect to the reception pad, a separation distance along a z-axis representing a direction perpendicular to the reception pad, and a torsional degree between the horizontal direction of the reception pad and a horizontal direction of the transmission pad.

\* \* \* \* \*